(12) United States Patent
Haler

(10) Patent No.: US 11,007,942 B2
(45) Date of Patent: *May 18, 2021

(54) VEHICLE-MOUNTED VIDEO SYSTEM WITH DISTRIBUTED PROCESSING

(71) Applicant: Digital Ally, Inc., Lenexa, KS (US)

(72) Inventor: Robert D. Haler, Blue Springs, MO (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,220

(22) Filed: Aug. 3, 2020

(65) Prior Publication Data

US 2020/0361385 A1    Nov. 19, 2020

Related U.S. Application Data

(63) Continuation of application No. 15/137,207, filed on Apr. 25, 2016, now Pat. No. 10,730,439, which is a
(Continued)

(51) Int. Cl.
| | |
|---|---|
| *H04N 5/225* | (2006.01) |
| *B60R 1/12* | (2006.01) |
| *B60R 11/04* | (2006.01) |
| *G07C 5/08* | (2006.01) |
| *H04N 5/232* | (2006.01) |
| *H04N 5/76* | (2006.01) |
| *H04N 5/765* | (2006.01) |
| *H04N 5/77* | (2006.01) |
| *H04N 5/775* | (2006.01) |
| *H04N 5/781* | (2006.01) |

(Continued)

(52) U.S. Cl.
CPC ............... *B60R 1/12* (2013.01); *B60R 11/04* (2013.01); *G07C 5/0891* (2013.01); *H04N 5/225* (2013.01); *H04N 5/2251* (2013.01); *H04N 5/22525* (2018.08); *H04N 5/23241* (2013.01); *H04N 5/23293* (2013.01); *H04N 5/76* (2013.01); *H04N 5/765* (2013.01); *H04N 5/772* (2013.01); *H04N 5/775* (2013.01); *H04N 5/781* (2013.01); *H04N 5/907* (2013.01); *H04N 7/18* (2013.01); *H04N 9/8205* (2013.01); *B60R 2001/1253* (2013.01); *B60R 2011/0033* (2013.01)

(58) Field of Classification Search
None
See application file for complete search history.

(56) References Cited

U.S. PATENT DOCUMENTS

| 6,690,268 B2 * | 2/2004 | Schofield | .................. B60R 1/04 |
| | | | 340/438 |
| 10,730,439 B2 * | 8/2020 | Haler | .................. H04N 5/23241 |

(Continued)

*Primary Examiner* — Eileen M Adams
(74) *Attorney, Agent, or Firm* — Erise IP, P.A.

(57) ABSTRACT

A vehicle-mounted system for recording video and audio. The system uses distributed processing, including encoding the video and audio at their source(s), and a high-speed, e.g., Ethernet, bus connecting the various system components and external devices. The system may include a display monitor which is integrated into the same housing as a rear view mirror of the vehicle, with the display monitor being located behind the mirror and video displayed on the monitor being visible through the mirror.

20 Claims, 10 Drawing Sheets

Related U.S. Application Data continuation of application No. 13/975,844, filed on Aug. 26, 2013, now Pat. No. 9,325,950, which is a continuation of application No. 12/189,192, filed on Aug. 10, 2008, now Pat. No. 8,520,069, which is a continuation-in-part of application No. 11/531,955, filed on Sep. 14, 2006, now abandoned.

(60) Provisional application No. 60/955,129, filed on Aug. 10, 2007, provisional application No. 60/717,602, filed on Sep. 16, 2005.

(51) Int. Cl.
    *H04N 5/907* (2006.01)
    *H04N 9/82* (2006.01)
    *H04N 7/18* (2006.01)
    *B60R 11/00* (2006.01)

(56) References Cited

U.S. PATENT DOCUMENTS

| | | | |
|---|---|---|---|
| 2003/0081121 A1* | 5/2003 | Kirmuss | H04N 7/181 348/143 |
| 2005/0100329 A1* | 5/2005 | Lao | G08B 13/19669 386/216 |
| 2006/0104600 A1* | 5/2006 | Abrams | H04N 7/181 386/223 |
| 2007/0250194 A1* | 10/2007 | Rhoads | G06Q 30/0277 700/94 |
| 2007/0300272 A1* | 12/2007 | Takanezawa | H04N 21/4334 725/105 |

\* cited by examiner

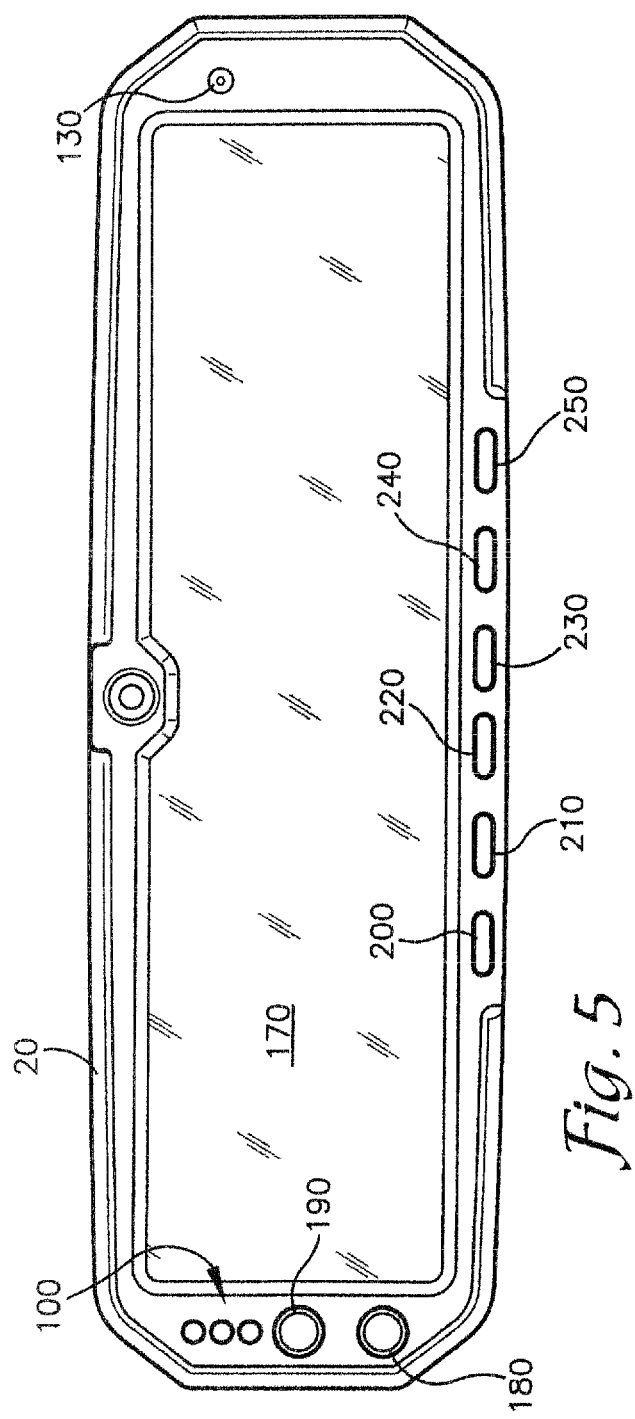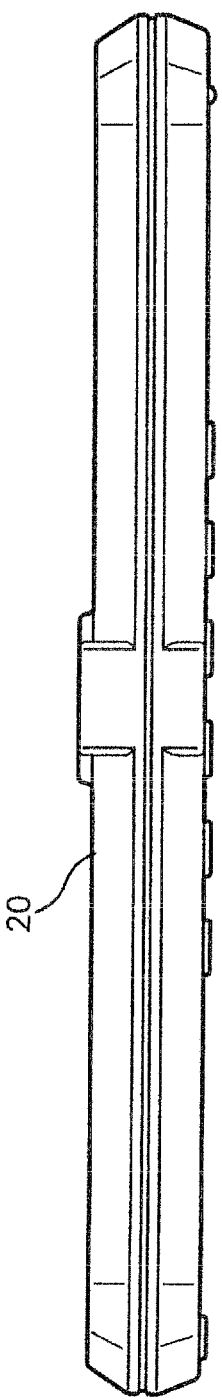

VEHICLE-MOUNTED VIDEO SYSTEM WITH DISTRIBUTED PROCESSING

RELATED APPLICATIONS

The present application is a continuation, and claims priority benefit with regard to all common subject matter, of earlier-filed U.S. patent application Ser. No. 15/137,207, filed Apr. 25, 2016, now U.S. Pat. No. 10,730,439, issued Aug. 4, 2020, and entitled "Vehicle-Mounted Video System with Distributed Processing" ("the '439 patent"). The '439 patent is a continuation and claims priority benefit with regard to all common subject matter, of earlier-filed U.S. patent application Ser. No. 13/975,844, filed Aug. 26, 2013, now U.S. Pat. No. 9,325,950, issued Apr. 26, 2016, and entitled "Vehicle-Mounted Video System with Distributed Processing" ("the '950 patent"). The '950 patent is a continuation, and claims priority benefit with regard to all common subject matter, of earlier-filed U.S. patent application Ser. No. 12/189,192, filed Aug. 10, 2008, now U.S. Pat. No. 8,520,069, issued Aug. 27, 2013, and entitled "Vehicle-Mounted Video System with Distributed Processing" ("the '069 patent"). The '069 patent is a continuation-in-part, and claims priority benefit with regard to all common subject matter, of U.S. patent application Ser. No. 11/531,955, filed Sep. 14, 2006, now abandoned, and entitled "Vehicle-Mounted Video System with Distributed Processing" ("the '955 application"). The '955 application is a non-provisional, and claims priority benefit with regard to all common subject matter, of U.S. Provisional Application No. 60/717,602, filed Sep. 16, 2005, and entitled "Rear View Mirror with Integrated Video System."

The '069 patent is also a non-provisional, and claims priority benefit with regard to all common subject matter, of U.S. Provisional Application No. 60/955,129, filed Aug. 10, 2007, and entitled "Vehicle-Mounted Video System with Distributed Processing." Each of the identified earlier-filed patent and patent applications are hereby incorporated by reference into the present patent application in their entirety.

FIELD

The present invention relates generally to vehicle-mounted systems for recording video and audio. More particularly, the present invention concerns such a system using distributed processing, including encoding the video and audio at their source(s), and a high-speed, e.g., Ethernet, bus connecting the various system components and external devices.

BACKGROUND

Many law enforcement vehicles include video systems for recording and displaying activity in and around the vehicle. Unfortunately, these systems typically consist of one or two cameras and an independent display monitor that is difficult to view while the vehicle is in operation. Moreover, the current systems are expensive, bulky, and difficult to operate and maintain. It is also difficult to find sufficient space for the camera, recording system, and monitor in the law enforcement vehicles, which are already heavily loaded with extra equipment. It is possible to locate certain components, such as the recording system, which do not need to be frequently accessed, in the trunk of the vehicle, but this then requires long cables extending through the vehicle to connect the recording system with the camera and monitor. Additionally, many current systems are limited to simply recording and displaying visual images of the activity, and do not provide any additional information associated with the activity.

Furthermore, current systems are designed with a single central processor unit (CPU) which controls most or all major functions, including encoding video received from a camera. Unfortunately, centralized processing creates bottlenecks for both speed and processing capabilities (depending on the CPU, encoding video signals may require 75% the CPU's processing capability), requires significant changes in order to add new hardware features, and, generally, results in an inability to make changes to the system without investing significant expense and time. Additionally, communicating unencoded analog signals within the vehicle to the single CPU can result in significant electrical interference and signal degradation.

SUMMARY

The present invention overcomes the above-identified and other problems by providing a vehicle-mounted video and audio recording system using distributed processing, including encoding the video and audio at their source(s), and a high-speed, e.g., Ethernet, bus connecting the various system components and external devices.

In one embodiment, the video system for a vehicle broadly comprises a video camera mounted on the vehicle and operable to both capture and encode video, a central control unit mounted on the vehicle and operable to receive and decode the encoded video, and a display monitor mounted on the vehicle and operable to display the decoded video.

In various implementations, the video system may further include any one or more of the following features. The video camera may be synchronized with the central control unit so as to provide an accurate time stamp associated with the video. The video camera may be operable to implement a pre-event recording loop. The video camera and central control unit may be connected by a high speed bus. There may be two or more video cameras connected to a hub, wherein the hub is connected to the central control unit, and the central control unit is operable to receive the encoded video from each of the two or more video cameras substantially simultaneously. The system may include a microphone operable to capture and encode audio, wherein the central control unit is operable to receive and decode the encoded audio, a vehicle interface box mounted on the vehicle and operable to interface an external device to the central control unit, wherein the external device may be any one or more of a crash sensor, a radar gun, and a speedometer, and a co-processing module mounted on the vehicle and operable to provide processing for an additional feature of the system, wherein the additional feature may be any one or more of a face recognition feature, a license plate recognition feature, a streaming video feature, and a wireless Internet access feature.

The system may include a rear view mirror housing, a mirror mounted in the rear view mirror housing, and the display monitor mounted in the rear view mirror housing substantially behind the mirror, and the mirror and the display monitor being configured so that the displayed video is viewable through the mirror.

The system may include a location determining device operable to determine a location of the vehicle when the video is captured, and a recording medium operable to record at a least a portion of the captured video and the location of the vehicle when the video was captured.

These and other details of the present invention are described in greater below in the section below titled DETAILED DESCRIPTION.

BRIEF DESCRIPTION OF THE DRAWINGS

Further features of the present invention will become apparent to those skilled in the art to which the present invention relates from reading the following description with reference to the accompanying drawings, in which:

FIG. 5 is a front elevation view of the rear view mirror of FIG. 1;

FIG. 6 is an side elevation view of the rear view mirror of FIG. 1;

FIG. 7 is a plan view of the rear view mirror of FIG. 1;

DETAILED DESCRIPTION

With reference to the figures, a video system is herein described, shown, and otherwise disclosed in accordance with a preferred embodiment of the present invention. More specifically, the present invention provides a vehicle-mounted video system that is capable of recording, storing, and replaying video images, wherein the video system includes at least one internal camera and a display monitor, with both being integrated into the same housing as a rear view mirror of the vehicle, and with the monitor being located substantially behind the mirror such that video images displayed by the monitor are visible through the mirror. The video system may also allow for capturing audio signals and other desirable information, including, for example, location and speed information.

Figure 1:
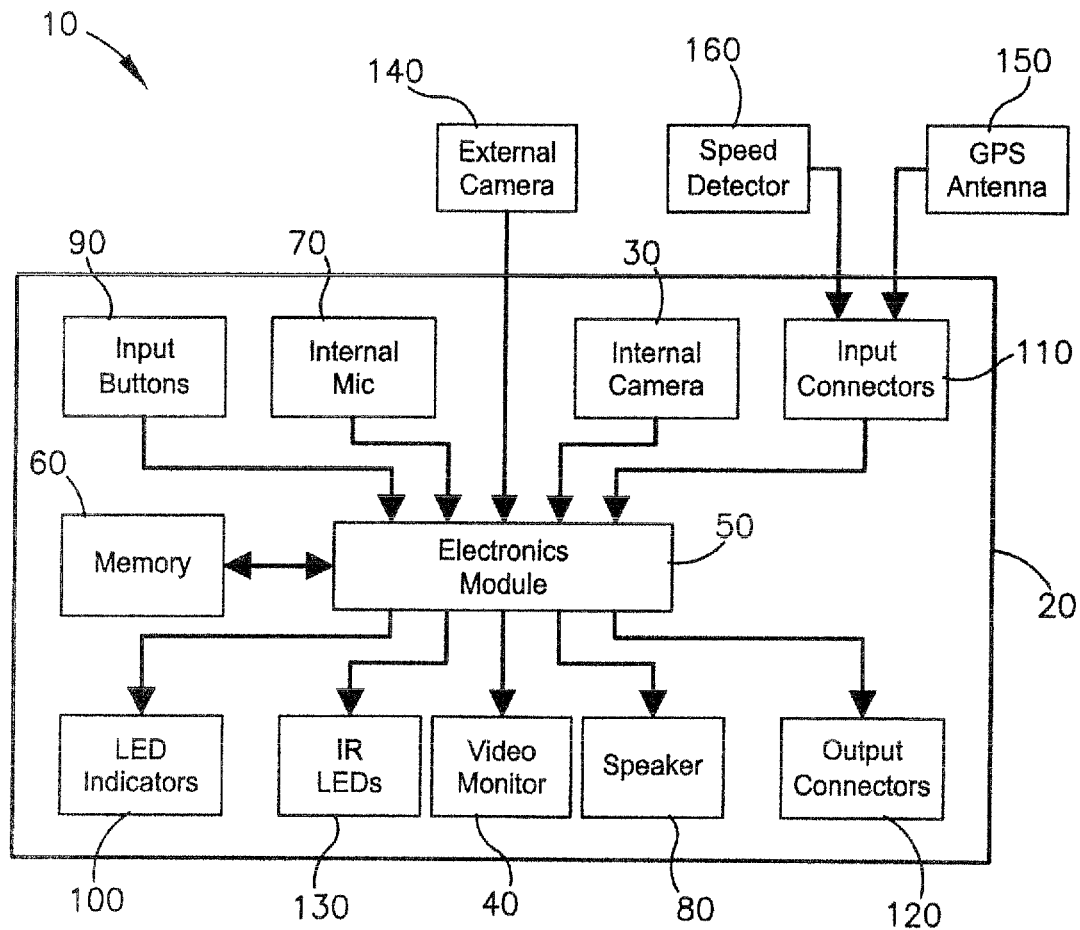
FIG. 1 is a functional block diagram of a video system according to one embodiment of the present invention.

Referring to FIG. 1, an embodiment of the video system 10 is shown broadly comprising various components mounted in or on the rear view mirror housing 20, including an internal camera 30, a video monitor 40, an electronics module 50, a memory 60, an internal microphone 70, a speaker 80, input buttons 90, LED indicators 100, input connectors 110, output connectors 120, and at least one infrared LED 130. The system 10 may also include an external camera 140, a GPS antenna 150, and a speed detector 160.

The internal camera 30 is typically positioned on an upper and central portion of the mirror housing 20 so that it can capture video images of activity within the passenger compartment of the vehicle. Alternatively, the internal camera 30 may be hidden behind the mirror 170. The internal camera 30 may be mounted at an appropriate angle, such as approximately between 10 degrees and 20 degrees to the left, so that the camera 30 is able to properly view the passenger compartment even when the mirror 170 is angled towards the driver during normal use. Camera 30 may also be mounted at approximately 160 degrees or greater when camera 30 is a wide-angle camera. One appropriate camera for use as the internal camera 30 is a 510×492 black and white CMOS sensor with TV resolution, 0.01 Lux sensitivity, and a 140 degree 4-element coated glass lens.

The external camera 140 is mounted outside of the mirror housing 20 in a separate enclosure. The external camera 140 is useful, for example, to record video images when an officer leaves the vehicle, such as during a traffic stop. One appropriate camera for use as the external camera 140 is a color CCD sensor NTSC with 768×484 pixels and 470 lines of resolution, a 10× optical zoom and auto focus capabilities, a wide viewing angle that is from 50.7 to 5.4 degrees, and standard and low light modes.

Figure 2:
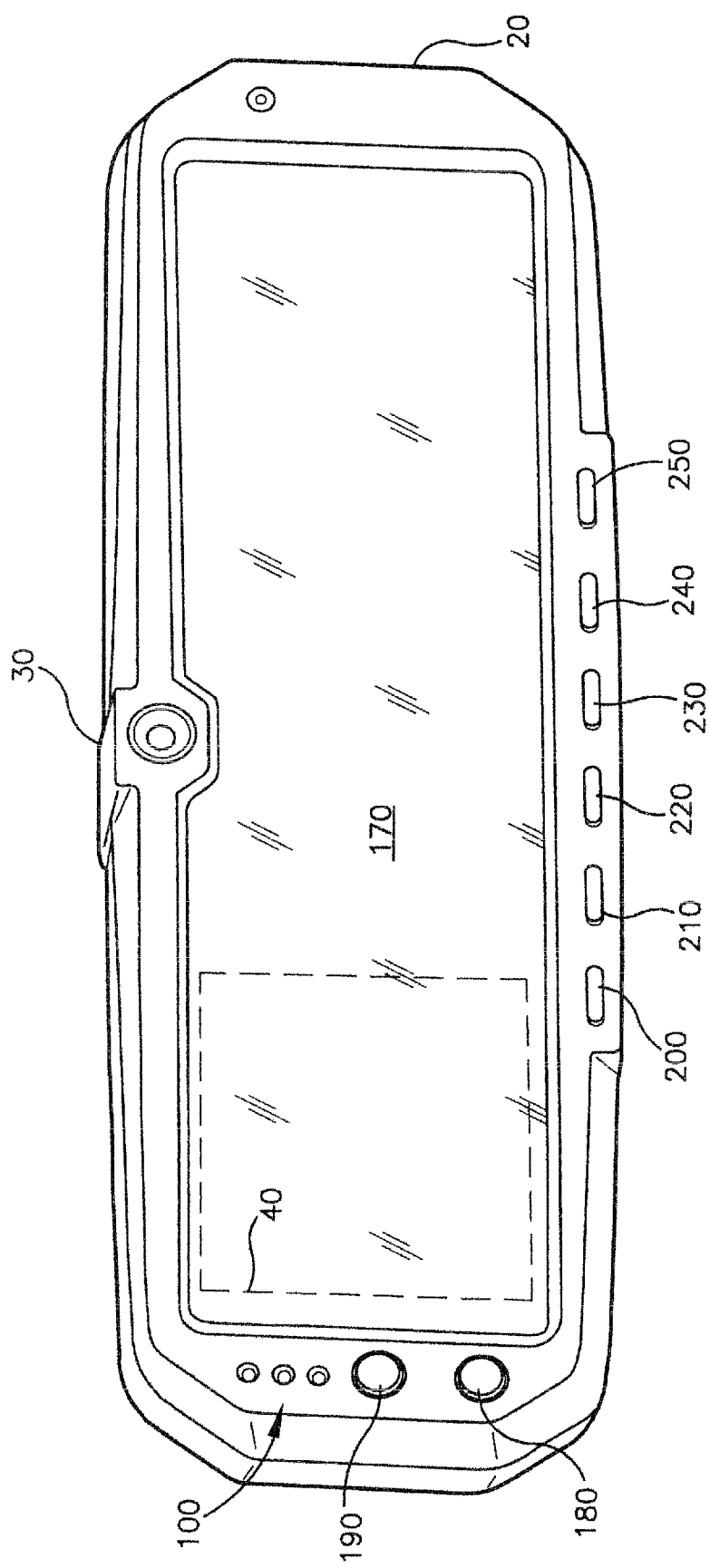
FIG. 2 is a perspective view of a rear view mirror constructed according to one embodiment of the present invention.
Figure 3:
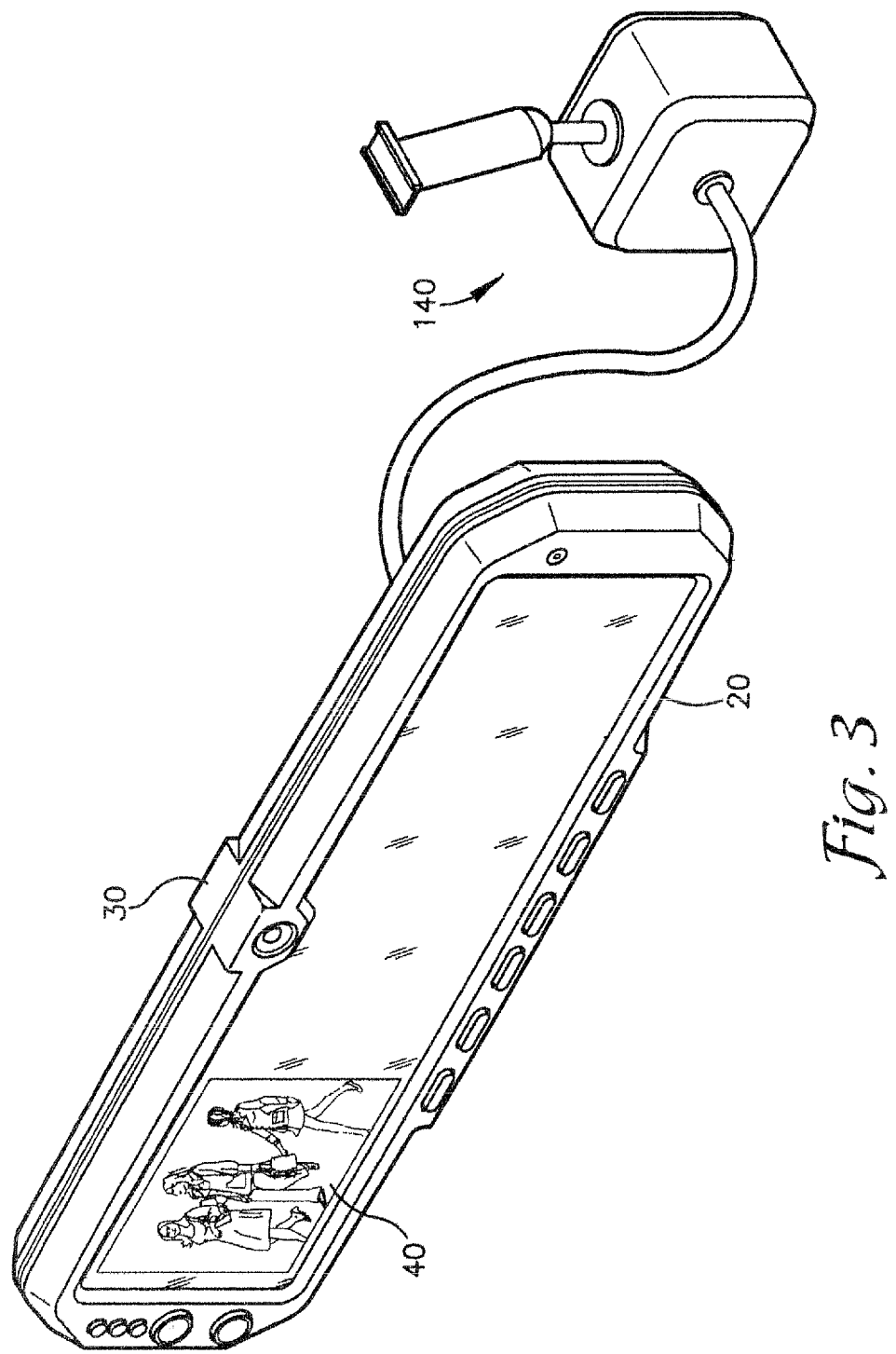
FIG. 3 is a perspective view of a rear view mirror constructed according to an embodiment of the present invention and illustrating an active monitor showing the image from a forward facing external camera mounted in close proximity to the rear view mirror.
Figure 4:
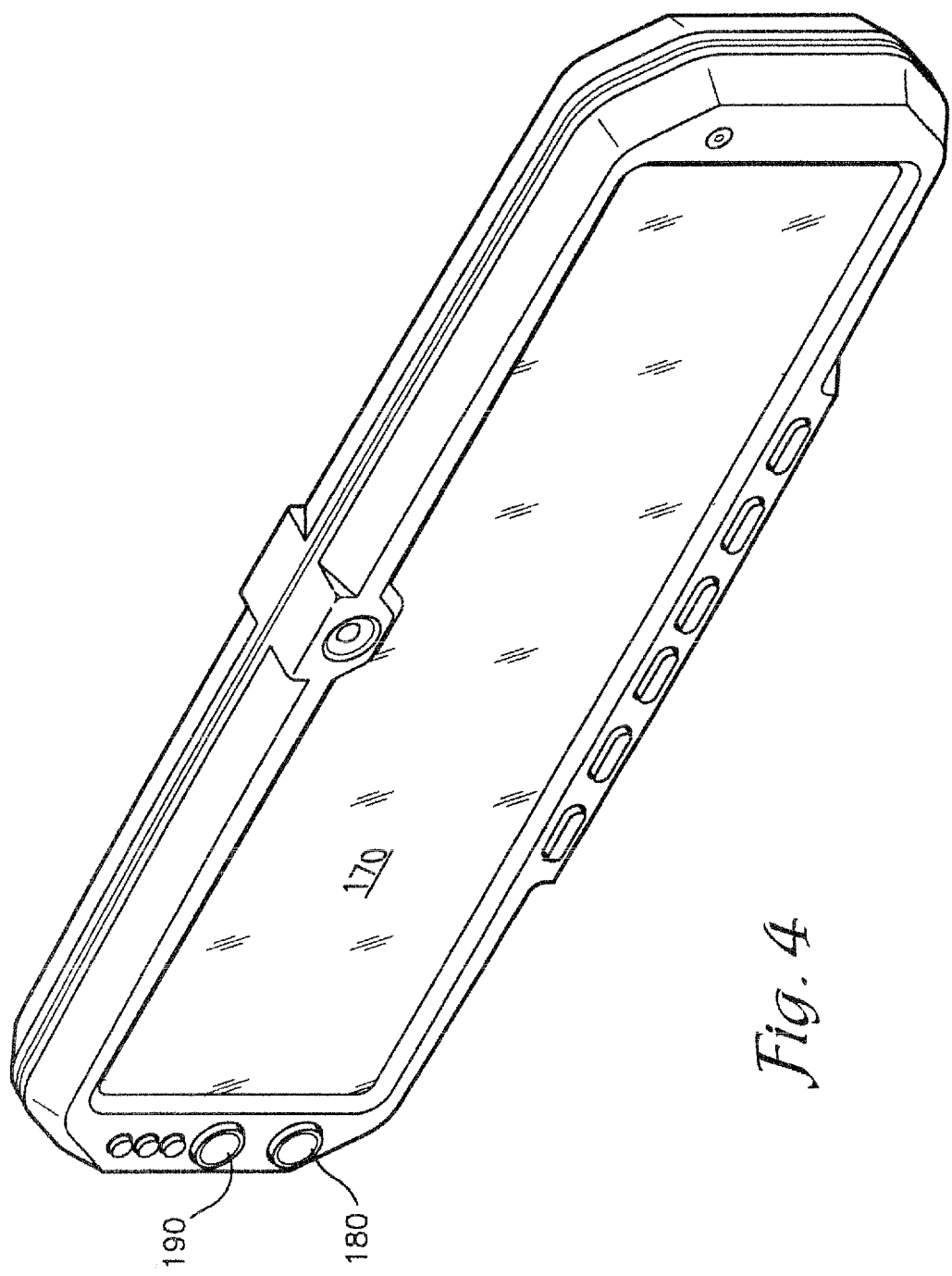
FIG. 4 is a perspective view of the rear view mirror of FIG. 1.

The monitor 40 is mounted substantially behind the mirror 170 (see FIGS. 2 and 3) and works in conjunction with the mirror 170 so that when the monitor 40 is turned on it is viewable through the mirror 170, and when it is turned off it is not visible. The monitor 40 may be operable to automatically turn off when the vehicle begins to move or when the vehicle's transmission is shifted into reverse or drive, so that the driver has full use of the mirror 170 while the vehicle is in motion. Alternatively, the monitor may be mounted adjacent to or only partially behind the mirror 170. One appropriate monitor for use as the video monitor 40 is a 3.5 inch diagonal, 640×480 TFT LCD monitor.

The electronics module 50 includes a number of electronic components, including components for receiving video signals from the video cameras 30, 140 and for transmitting video signals to the monitor 40. The electronics module 50 also includes components operable to receive and execute instructions stored in internal memory. In one embodiment, for example, these instructions include menu instructions for setting operational modes and resolutions. These instructions may be updated by loading instructions into a memory card and then inserting that card into a port in the system 10.

The input and output connectors 110, 120 are connected to the module 50 for receiving electronic signals thereto and transmitting electronic signals therefrom. The input connectors 110 may include, for example, a connector for power, for the output from the speed detector 160, and for the output from the GPS antenna 150. The input connectors 110 may also include one or more connectors for receiving signals to trigger operation of the system. These triggers may include, for example, turning on the vehicle's siren and/or signal lights. The input connectors 110 may also include a connector for receiving the output of a second external camera, such as a rear-facing camera, and a connector for receiving the output of a second external microphone. The input connectors 110 may also include a port, such as a USB 2.0 port, to allow for directly accessing the memory 60 using a laptop or other computer. The output connectors 120 may include, for example, an audio/visual connector for transmitting audio/visual signals to an external monitor or recording device. Additionally or alternatively, any one or more of these physical connectors 110, 120, may be replaced with wireless communication technology allowing the system 10 to wirelessly receive or transmit any of the aforementioned input or outputs. In one embodiment, the input and output connectors 110, 120 are provided on an interface module or block which is not located on or integrated into the housing 20, but rather is located in a remote location, such as under the vehicle's dash, and operatively coupled with the module 50 by wire or wirelessly.

The module 50 may also include components for receiving audio signals from audio sources, such as the internal microphone 70, and for transmitting audio signals to the speaker 80. The module 50 may also include components for receiving wireless signals from one or more remote microphones, such as a wireless microphone worn by the officer. In this case, the module 50 may include an integrated 900 MHz (or another suitable frequency allowed by law), spread spectrum, dual receiver capable remote microphone system with a nominal range of up to approximately 1000 feet or greater (a range of several miles may be achieved under the proper conditions).

The module 50 may also include an integrated GPS receiver connected to the GPS antenna 150. Utilizing the information provided by these components, the module 50 may mark recorded video with real-time position data. The system may include a "dead reckoning" function which works with GPS to allow for operation in shielded locations, such as underground garages.

The module 50 may also be connected to the speed detector 140, which may be a radar gun or other conventional speed detecting device, and operable to record speed information provided by the speed detector 140 along with the video images.

The memory 60 is in communication with the module 50 for receiving and storing the video, audio, and other data. One appropriate form of electronic memory for use as the memory 60 is a CF card form factor removable memory module, and one appropriate format for storing the data is MPEG 4 format. Other appropriate forms of electronic memory for use as the memory 60 include micro hard drives, laptop-type hard drives, and flash memory cards. As will be understood by those in the field, the amount of data storable in the memory 60 is dependent, at least in part, on the resolution utilized by the electronics module 50. It is contemplated, however, that the memory 60 may store approximately one hour of data per gigabyte of memory per simultaneous camera for high resolution, approximately two hours of data per gigabyte of memory per simultaneous camera for medium resolution, and approximately four hours of data per gigabyte of memory per simultaneous camera for low resolution.

Referring also to FIGS. 2-7, the input buttons 90 are mounted on the video housing 20 and allow for controlling various components and functions of the system 10. In one embodiment, these buttons 90 may include and operate as follows. A REC button 180 triggers recording in the mode shown in a menu displayed on the monitor 40. Pressing the REC button 180 during recording allows for cycling through the various night and day camera settings. Day and night recording modes may be set automatically using information from an on-board real-time clock or from a light sensor or from the camera 30. A red indicator LED 100 on the front of the unit and a red record LED on the back of the unit are both turned on when the system is recording. A MARK button 190 sets a place for the current GPS position in the video data. A DISP button 200 toggles through settings such as Video Monitor and Control illumination/indicators ON, Video Monitor OFF, Control illumination/indicators ON, and Video Monitor and Control illumination OFF. A Menu button 210 toggles the menu display on the monitor 40 and turns the monitor 40 ON if the display is OFF. A "Play" (large right-facing arrow) button 220 executes commands in Menu Mode and toggles Play/Pause in video playback mode. A "Stop" (square) button 230 acts to cancel the current function in Menu Mode, stops video in Playback Mode, and toggles pre-set Zoom positions in Record Mode. A REV/DOWN button 240 zooms the camera 30 towards Wide in Record Mode, moves down in Menu Mode, and moves in reverse in Playback Mode. A FWD/UP button 250 zooms the camera 40 towards TELE in Record Mode, moves up in Menu Mode, and moves forward in Playback Mode. Other buttons may include an auto zoom feature to assist in reading license plates on other vehicles.

The at least one infrared LED 130 is disposed in the mirror housing 20 and operable to provide infrared illumination inside the vehicle's passenger compartment so that the internal camera 30 can capture video images even when there is little visible light.

Power is supplied to the components of the video system 10 from the vehicle. The power provided is heavily filtered and regulated to avoid interference. The video system 10, using the particular components described herein, may require 4 amps from a 10 V to 13.8 V DC power supply.

The rear view mirror includes the mirror 170 mounted within the housing 20. One appropriate mirror 170 is constructed of mirror glass. One appropriate housing for use as the housing 20 is constructed of a polycarbonate plastic that is resistant to high impacts and high temperatures and is approximately between 12 inches and 14 inches long, 3 inches and 4 inches high, and 0.5 inches and 1.5 inches deep. The vehicle's conventional rear view mirror mount may be replaced by a stronger mount better able to support the weight of the mirror 170 and housing 20 and other components of the system 10. The input buttons 90, discussed above, may be mounted on a front or side surface of the housing 20. The mirror housing 20, and the housings of other components of the system, may include materials operable to shield against electrical or radio interference.

Additionally, the system 10 may be provided with a "stealth" mode in which the cameras 30, 140 and the microphone 70 are active and recording, but the lights and indicators, such as the LED 100, are turned off, thereby making the system 10 appear to be dormant.

Additionally, the system 10 may provide "pre-event" recording in which the system 10 records constantly in a loop of a selected duration of time, such as thirty seconds or sixty seconds, so that when an event triggers recording, the events occurring shortly prior to the initiation of recording are also recorded and stored.

Additionally, various embodiments of the system 10 include any one or more of the following features. The system 10 requires entry of a password or code prior to accessing and changing operational settings. The system 10 requires use of a key to remove any removable memory components. The system 10 incorporates electronic watermarks into the recorded video images to prevent tampering or alteration. The system 10 allows for wirelessly downloading the contents of the memory 60 to a laptop or other computer. The system 10 allows for streaming the live video from the cameras 30, 140, and possibly other inputs and/or outputs, via a high-speed wireless data network. The system 10 is operable to encode multiple video streams from four or more cameras simultaneously. The system 10 includes a remote control device for allowing a user to remotely control the operation of the system 10. The system 10 includes a temperature sensor and temperature indicator operable to detect and warn the user if the system 10 is at risk of malfunction or damage due to an ambient temperature that is too high or too low for proper operation, such as may easily occur in a vehicle on a very hot or very cold day. The housing 20, and possibly the housings of other components of the system 10, is vented to dissipate heat, and may include other passive or active features to moderate temperature, especially in relatively extreme environments.

Figure 8:
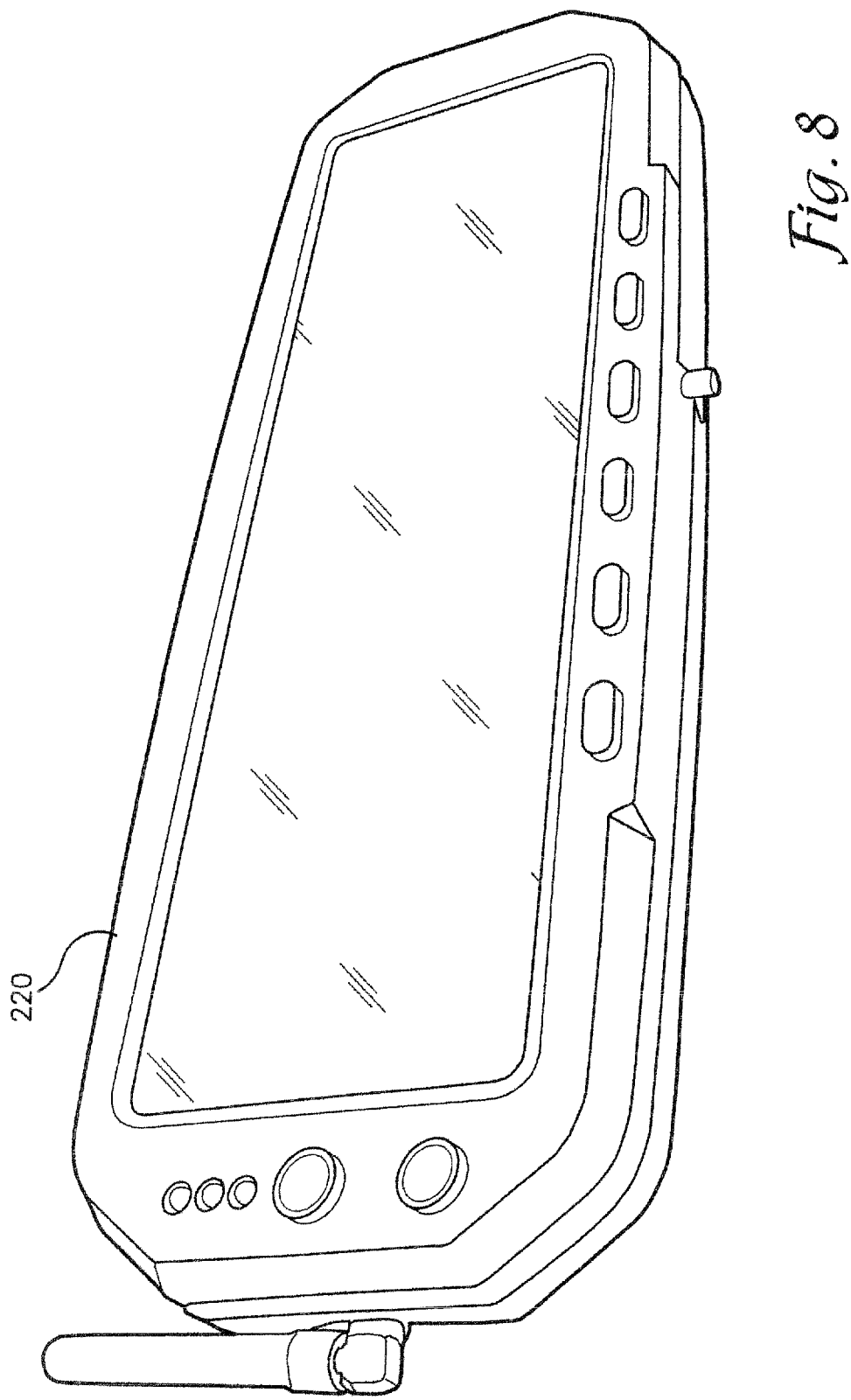
FIG. 8 is a perspective view of a rear view mirror constructed according to another embodiment of the present invention.
Figure 9:
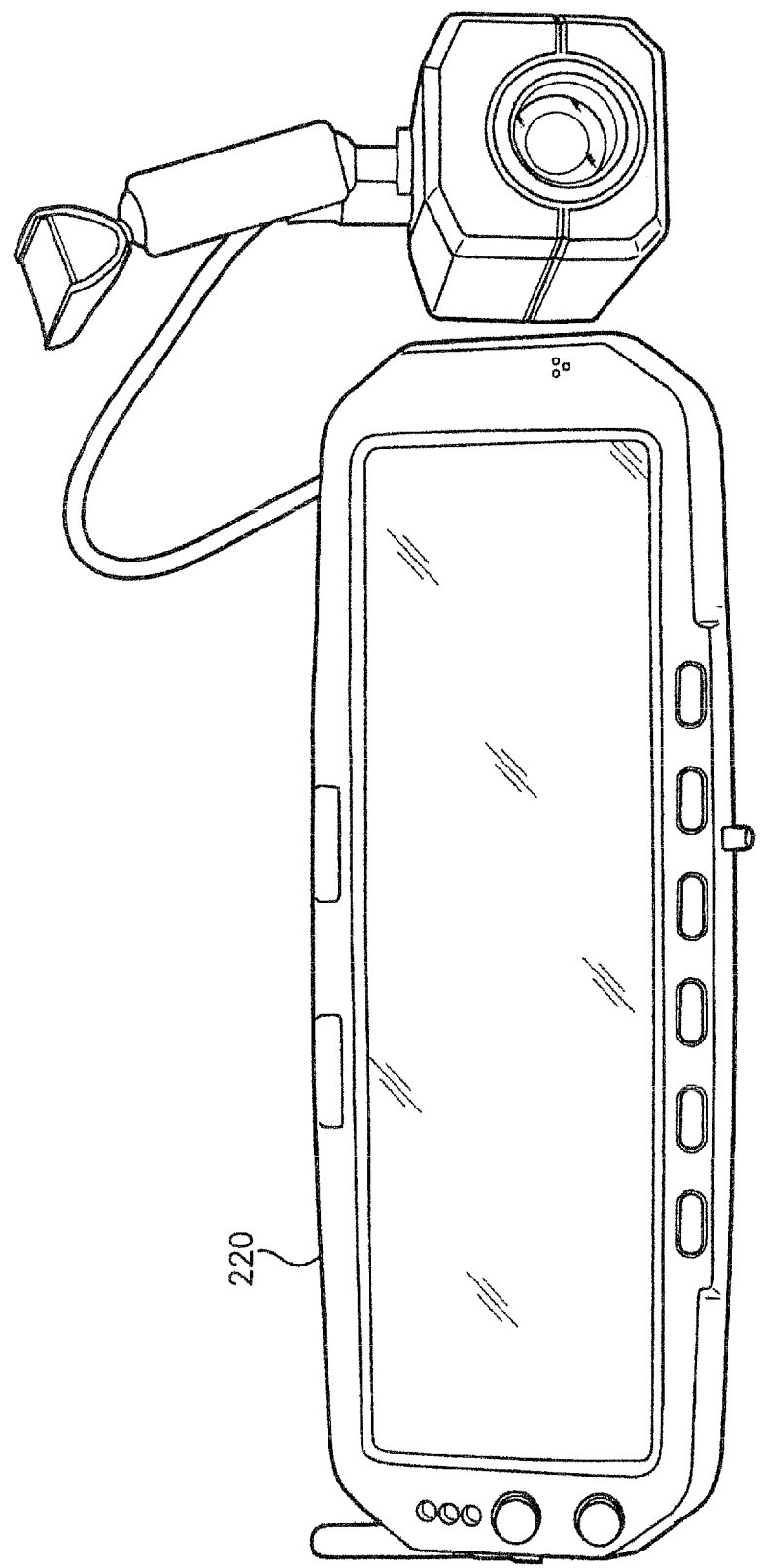
FIG. 9 is a front elevation view of the rear view mirror of FIG. 8.
Figure 10:
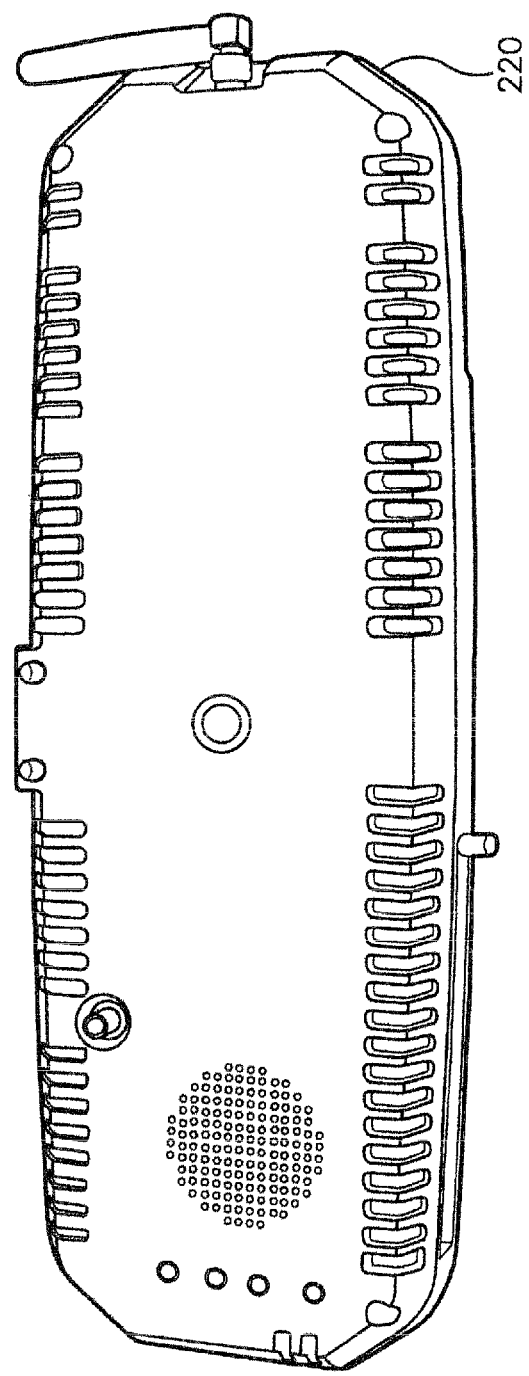
FIG. 10 is a rear elevation view of the rear view mirror of FIG. 8.

Referring also to FIGS. 8-10, a second implementation of the system 10 is shown which is somewhat different in appearance than the implementation shown in FIGS. 2-7, particularly with regard to the housing 220 and the layout of certain components thereabout, but which is otherwise substantially similar in functionality.

It will now be apparent that the present invention is both inexpensive to manufacture and easy to use, especially when compared to current vehicle video systems. The video system of the present invention is fully integrated into a small, easily installable and replaceable package that requires minimal space inside the vehicle. Thus, it replaces several single-purpose devices with a multifunction device that requires the same or less space in the vehicle. Moreover, the video system includes novel features and/or capabilities not present in currently available systems. Those skilled in the art will perceive additional significant improvements, changes, and modifications.

Figure 11:
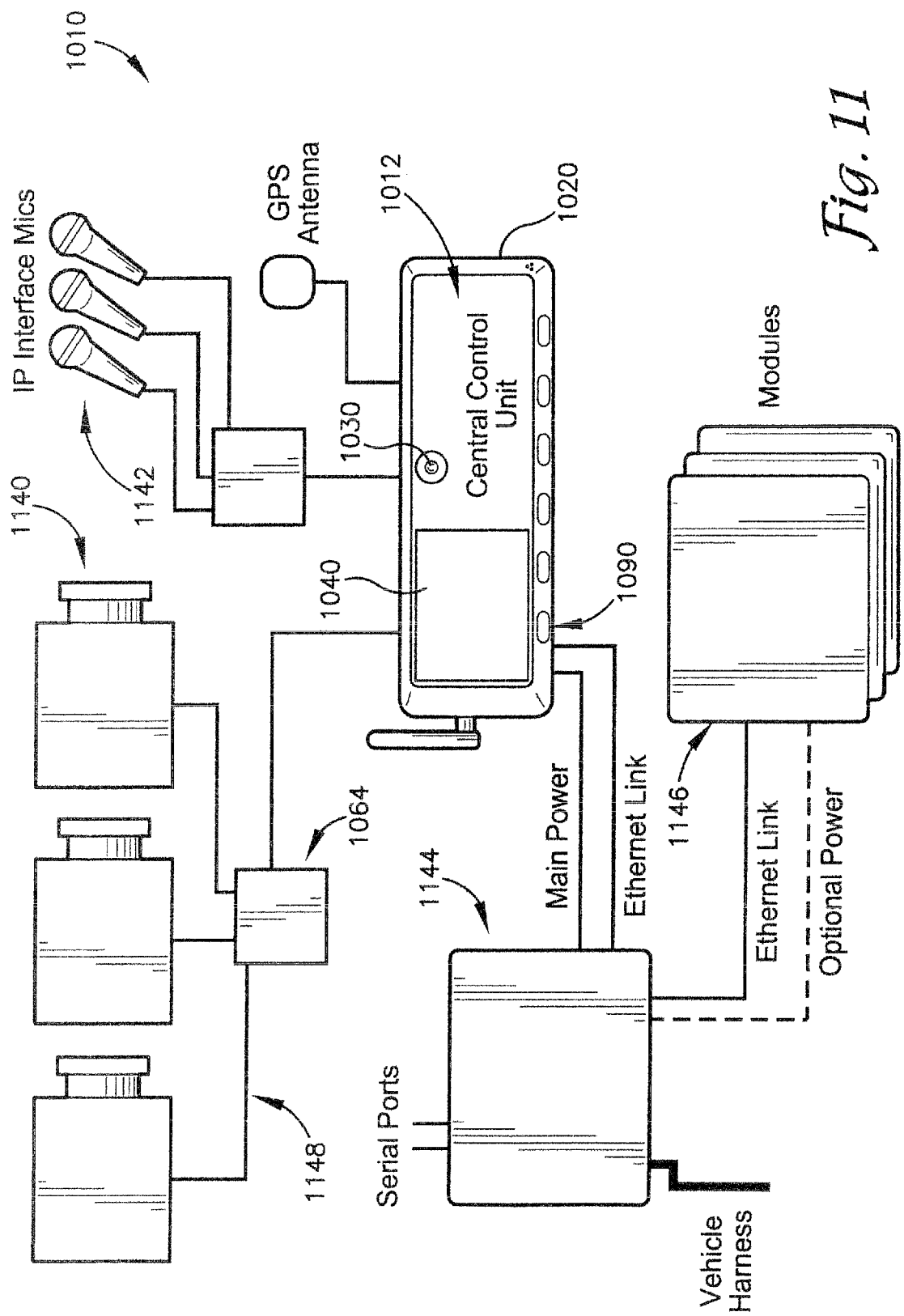
FIG. 11 is a block diagram of a video system according to another embodiment of the present invention.

Referring also to FIG. 11, another embodiment of the above-described system is shown which uses distributed processing, including encoding the video and audio at their source(s) rather than at a centralized location, and a high-speed, e.g., Ethernet, bus connecting the system components and various external devices.

In one implementation, the system 1010 broadly comprises the rear view mirror housing 1020, a central control unit 1012, the internal camera 1030, the display monitor 1040, the input buttons 1090, one or more of the external cameras 1140, one or more external microphones 1142, a vehicle interface box 1144, one or more coprocessing modules 1146, and the high-speed bus 1148.

In this implementation, the central control unit 1012 does not itself encode the video and audio generated by the external camera 1140 and microphone 1142, but rather receives the signals already encoded. As such, the central control unit 1012 includes a decoder for decoding the encoded video and audio to allow for communication via the display monitor 1040 and an associated speaker.

The one or more external cameras 1140 are each operable to both capture video and encode the video before transmitting it to the central control unit 1012 for display and storage. Because encoding can account for 75% of the processing workload in prior art systems, encoding the video at the camera 1140 rather than at the CPU of the central control unit 1012 advantageously allows the central control unit 1012 to support multiple external cameras simultaneously.

Figure 12:
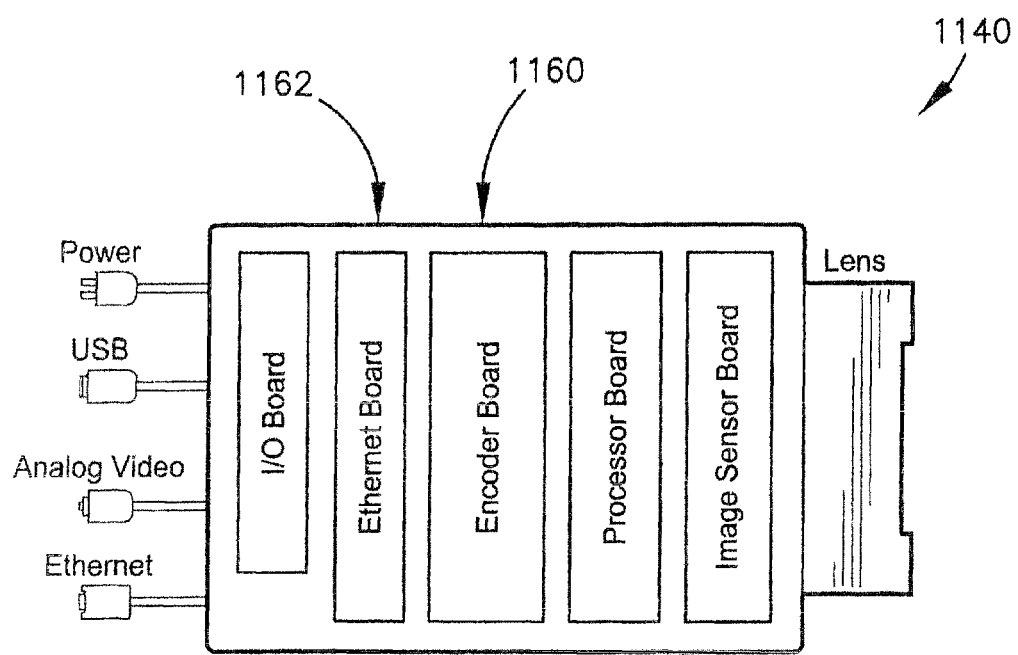
FIG. 12 is a block diagram of a camera component of the video system of FIG. 11.

Generally, existing IP ("Internet protocol") cameras are unsuitable for use in the present system 1010 because they have a tendency to lose frames, which is not acceptable for law enforcement applications in which the video might be used as evidence, and because they have relatively narrow bandwidths, which is also problematic for law enforcement applications in which activity often takes place under extreme lighting conditions, e.g., bright streetlights and dark shadows. However, referring also to FIG. 12, with significant modification, a camera potentially suitable for use as the external camera 1140 in the system 1010 is the IP Reference Camera available from Nuvation Research Corporation. This particular camera includes its own onboard CPU 1160 for encoding video and audio, can be upgraded to high definition (HD) by changing the CPU, and includes an Ethernet port 1162. The IP Reference Camera is significantly less likely to lose frames and has a significantly larger bandwidth than other IP cameras. Nevertheless, as mentioned, the IP Reference Camera still requires significant modification for use in the present system 1010. For example, it is necessary to synchronize the CPU of the central control unit 1012 with the CPUs 1160 of the cameras 10 1140 in order to obtain an accurate time stamp. Also, the pre-event recording loop, described above, is, in this embodiment, implemented on the camera 1140.

In one implementation of the present system, a camera used in conjunction with the present system, such as the Nuvation Research Corporation IP Reference Camera described above, includes a storage component such that captured frames are stored in the camera in addition to being sent to central control unit 1012. These stored frames are also time-stamped during the normal course of operation of the present system. Thus, in the event any frames are lost during transmission from the camera to central control unit 1012, central control unit 1012 is able to request that the camera transmit the lost frames again. Once the lost frames are received, central control unit 1012 can integrate the lost frames into the data already received so that a complete record is formed. Time synchronization between the camera and central control unit 1012 ensures that central control unit 1012 is able to accurately identify missing frames, query the camera for those frames, and properly integrate the missing frames into the record once they are received.

The one or more external microphones 1142 are also each operable to both capture audio and encode the audio before transmitting it to the central control unit 1012 for play or storage, thereby advantageously allowing the central control unit 1012 to support multiple external microphones simultaneously.

The vehicle interface box 1144 is operable to interface various external devices to the system 1010. The external devices may include, for example, any one or more of a crash sensor, a radar gun, and a speedometer.

The one or more co-processing modules 1146 are each operable to provide processing for various additional features to the system 1010. The additional features may include, for example, any one or more of a face recognition feature, a streaming video feature, and a wireless Internet access feature. Further, wireless access may be provided for other networks, such as wireless mesh, that are not associated with the internet in any way.

The high-speed bus 1148 is operable to connect and allow for communication between the various other components of the system 1010. In one implementation, the bus is an Ethernet bus carrying power and data on the same cable. In one implementation, components, such as the cameras 1140 and microphones 1142 spaced apart from the central processing unit 1012, are connected to a hub 1064, and the hub 1064 is connected to the central processing unit 1012 by a single cable. In other implementations of the present system, other methods of communication between the various components of the present system may be used. Such other methods may include, for example, wireless communications, or combinations of wireless and wired communications. Further, although the implementation of the present system shown in the drawings utilize Power Over Ethernet (POE) in order to provide power to components of the present system, it is contemplated that any suitable method of providing such power may be utilized, and that numerous methods of providing power are known to those of skill in the art. It is further contemplated that a backup power source, such as a batter backup, may be used in conjunction with the present system.

It will now be apparent that, along with the earlier-discussed advantages of the first embodiment of the system, the second embodiment provides a number of additional advantages over prior art systems. For example, each external camera and microphone encodes its own video and audio, and therefore, the central control unit can support multiple cameras and microphones simultaneously, the cameras and microphones can be located much further away from the central control housing (which is important in larger vehicles) because encoded digital signals are less susceptible to the electrical interference and signal degradation experienced by unencoded analog signals, and the cameras and microphones can be easily added or replaced without requiring significant changes to the central control unit. Additionally, the high-speed bus carries both data and power to system and external components on the same cable, thereby eliminating the plurality of separate cables for power, video, audio, and communication required by prior art systems. Bus hubs allow for collecting and communicating data streams from multiple cameras, microphones, and other devices over a single cable, thereby eliminating the need to provide a long cable for each device. Bus connectivity and standard communication protocols allow for quickly adding features using plug-in modules. More generally, changes to the system can be accomplished with significantly less expense and time, allowing the system to adapt to user demands and extending the system's useful life.

Although various exemplary data formats and data transfer protocols are identified above, it is contemplated that any suitable format or protocol, whether now existing or hereafter developed, may be used in conjunction with the present invention. The discussion of specific formats or protocols herein is not intended to limit the scope of the present invention. For example, although the MPEG-4 format is mentioned above for encoding and storing audiovisual data obtained by the present system, it is contemplated that other formats such as, for example, H.263 and H.264, may also be used. Likewise, audiovisual data may be stored in high-definition (HD) format. Hardware or software changes or upgrades may be required in order to change formats, however the inventive functionality of the present system, as described herein, is preserved regardless of the specific format used. Because one goal of law enforcement implementations of the present system is to produce an evidentiary record, it is preferred that a lossless format be used in those implementations.

In addition to various suitable formats that may be used in conjunction with the present system, it is contemplated that any suitable data transfer protocol may be used. For example, real-time streaming protocol (RTSP) may be used to transfer data in the present system providing that the system is adapted to recover any lost frames from the camera. User datagram protocol (UDP) provides a better, lossless protocol for use with the present system. Any suitable existing protocol may be used, and new protocols may be developed for use with the present system. Because implementations of the present system include a data storage function in the camera, as described above, for retrieval of frames lost during data transfer, it is contemplated that typical IP cameras having such a storage feature may be used, with the system ensuring that lost frames are faithfully transmitted to central control unit 1012 when requested therefrom.

As noted above, the present system may be used with a variety of software, audiovisual formats, data transfer protocols, and the like. In some instances, changes to formats or protocols, or even making hardware changes such as upgrading the system to a HD-capable camera, may require that the software of the present system be updated. In some implementations of the present system, it is contemplated that the system software will be capable of being upgraded in the field. In such implementations, software upgrades may be provided via a memory card, portable flash memory device, a wireless data link to a portable devices, a wireless internet data link, or any other suitable device or method for upgrading the system software in the field. In some implementations wherein wireless communications are used for system upgrades, it is contemplated that the present system may optionally include a wireless communications component adapted to connect to a remote source for obtaining updates automatically. Such communications could, for example, be carried out over the internet via a cellular communications signal that allows the present system to access the internet.

In addition to what has been described above, various peripheral devices may be utilized in conjunction with the present invention. In law enforcement implementations of the present system, for example, or in other implementations where security is important, the present system may be provided with a biometric identification component or other secure identification component. In an implementation of the present system requiring biometric identification, for example, a fingerprint may be required before a user of the present system can log into the system and begin to use the system. Other security peripherals include, for example, a dongle carried by a user of the present system that can be presented to the system in order to verify the identity of a user. Any suitable security component or method may be included with the present invention.

In addition to maintaining or verifying user security, the present system may also include additional components to establish the security and evidentiary value of the audiovisual data recorded thereby. For example, it is contemplated that the cameras 1140 associated with the present system include a unique identifier, such as a serial number or other identifier that is unalterable, and that audiovisual signals obtained by any given camera are stamped with that camera's identifier. Thus, the identity of the camera that acquired any given data is verified and secured along with the actual data recorded by the system.

It is further contemplated that a CD or DVD burner may be provided as a component of the present system so that a user of the system can make a copy of captured audiovisual data while in the field. Any suitable recording device and medium known in the art may be used in association with the present invention.

Peripheral devices used for interfacing with the present system may also be provided. For example, a keyboard may be provided, the keyboard adapted to plug directly into the present system or to communicate wirelessly with the present system via Bluetooth, infrared, or other suitable method of wireless communication. Further, it is contemplated that a PDA, laptop, smartphone, or other mobile device may be adapted (for example by installing software thereon) for communication with and manipulation of the present system. Such devices may be used to manipulate a display associated with the present system, or to configure or control the present system.

With respect to any of the various peripherals that may be associated with the present system, whether described herein or not, it is contemplated that the peripherals may be plugged into or otherwise associated with electronics module 50 or central control unit 1012, or that any of cameras 1140 may be adapted to communicate with the peripherals, either through a hard-wired or wireless connection.

Although the invention has been disclosed with reference to various particular embodiments, it is understood that equivalents may be employed and substitutions made herein without departing from the contemplated scope of the invention. For example, specific suitable hardware, processors, software, and the like as described above is exemplary and not intended to limit the present invention. Any suitable hardware may be used to implement the inventive functionality of the present system.

What is claimed is:

1. A video system for a vehicle, the system comprising:
a rear view mirror housing;
a mirror mounted in the rear view mirror housing;
a first video camera attached to the rear view mirror housing and configured to capture first video data;
a second video camera configured to capture second video data,
wherein the first video camera and the second video camera are configured to implement a recording loop;
a first video camera memory storing the first video data;
a second video camera memory storing the second video data;
at least one microphone configured to capture audio data;
a central control unit configured to receive the first video data from the first camera, the second video data from the second camera, and the audio data from the at least one microphone,
wherein the first video camera and the second video camera are synchronized via the central control unit so as to provide an accurate time stamp associated with the respective captured video,
wherein lost frames are retrieved by the central control unit from the first video camera memory when it is determined that the first video data received at the central control unit does not include the lost frames;
a user input configured to be manipulated by a user; and
a display monitor configured to selectively display at least one of the first video data and the second video data.

2. The video system of claim 1, wherein the central control unit is configured to play back previously recorded video data on the display monitor.

3. The video system of claim 2, wherein the display monitor is configured to display setting information thereon, such that the user can change the setting information by manipulation of the user input.

4. The video system of claim 3, wherein the display monitor is mounted in the rear view mirror housing substantially behind the mirror, and the mirror and the display monitor being configured so that the displayed video is viewable through the mirror.

5. The video system of claim 1, further comprising a memory port adapted to receive a removable memory module, wherein the removable memory module is operable to receive and store the first video data, the second video data, and the audio data from the central control unit.

6. The video system of claim 1, wherein the system includes day and night recording modes.

7. The video system of claim 1, wherein the first camera and the second camera are wide-angle cameras.

8. The video system of claim 1, further comprising an audio/visual connector for transmitting video data and audio data to an external monitor.

9. The video system of claim 1, wherein the first video data is encoded at the first video camera, the second video data is encoded at the second video camera, and the audio data is encoded at the microphone.

10. A method of storing video data of a rear view mirror video camera apparatus, comprising the steps of:
receiving a first set of video data from a first video camera attached to a rear view mirror housing;
receiving a second set of video data from a second video camera;
wherein the first video camera and the second video camera are configured to implement a recording loop,
storing the first video data at a first video camera memory;
storing the second video data at a second video camera memory;
receiving audio data from at least one microphone;
synchronizing, by the central control unit, the first video camera and the second video camera so as to provide an accurate time stamp associated with the respective captured video;
retrieving lost frames from the first video camera memory by a central control unit processor when it is determined that the first video data received at the central control unit does not include the lost frames;
receiving user input at a user input device; and
displaying at least one of the first video data and the second video data at a display monitor.

11. The method of claim 10, wherein the display monitor is mounted in the rear view mirror housing substantially behind a mirror, and the mirror and the display monitor being configured so that the displayed video is viewable through the mirror.

12. The method of claim 10, further comprising the steps of:
encoding the first video data at the first video camera and encoding the second video data at the second video camera, and
including a timestamp with the first video data and the second video data.

13. The method of claim 10, encoding the audio data at the microphone at least by converting the audio data from an unencoded analog signal to a digital signal.

14. The method of claim 10,
wherein the display is configured to selectively display no video data, the first video data, and the second video data,
wherein the camera apparatus includes day and night recording modes, and
wherein the first camera and the second camera are wide-angle cameras.

15. The method of claim 10, wherein the display monitor is configured to play back on the display previously recorded video data from a removable memory module.

16. One or more non-transitory computer-readable media storing computer-executable instructions that, when executed by at least one processor, perform a method of storing video data from a first video camera and a second video camera of a vehicle, the system comprising:
receiving a first set of video data from the first video camera attached to a rear view mirror housing;
receiving a second set of video data from the second video camera;
wherein the first video camera and the second video camera are configured to implement a recording loop,
storing the first video data at a first video camera memory;
storing the second video data at a second video camera memory;

receiving audio data from at least one microphone;

synchronizing, by the central control unit, the first video camera and the second video camera so as to provide an accurate time stamp associated with the respective captured video;

retrieving at a central control unit from the first video camera memory when it is determined that the first video data received at the central control unit does not include the lost frames;

receiving user input at a user input device; and displaying at least one of the first video data and the second video data at a display monitor.

17. The media of claim 16, wherein the computer-executable instructions are further executable to perform the step of storing, at a removable memory module, the first video data from the first video camera, the second video data from the second video camera and the audio from the at least one microphone such that video signals from the first video camera and the second video camera are simultaneously and continuously encoded and stored in the removable memory module.

18. The media of claim 16, wherein the computer-executable instructions are further executable to perform the steps of:

encoding the first video data at the first video camera;

encoding the second video data at the second video camera, and encoding the microphone data at the microphone.

19. The media of claim 16, wherein the computer-executable instructions are further executable to perform the steps of:

receiving a user input from a user input device on the review mirror housing; and playing back previously recorded video data on the display monitor by at least one processor associated with the central control unit based on the user input.

20. The media of claim 16, wherein the display monitor is mounted in the rear view mirror housing substantially behind a mirror, and the mirror and the display monitor being configured so that the displayed video is viewable through the mirror.

\* \* \* \* \*